United States Patent [19]

Hoffman

[11] 3,958,231

[45] May 18, 1976

[54] SEQUENTIAL TIME-BASE LOCK SYSTEM

[76] Inventor: Ronald J. Hoffman, 752 Delverne Ave., SW., Canton, Ohio 44710

[22] Filed: July 1, 1974

[21] Appl. No.: 484,439

[52] U.S. Cl. ........................ 340/274 C; 340/274 R; 340/164 R; 340/149 A

[51] Int. Cl.$^2$ ........................................... G05B 1/00

[58] Field of Search........ 340/164 R, 149 A, 274 C, 340/276; 235/61.7 B; 317/134; 70/278

[56] References Cited

UNITED STATES PATENTS

| | | | |
|---|---|---|---|
| 3,633,167 | 1/1972 | Hedin | 340/164 R |
| 3,731,076 | 5/1973 | Nagata | 340/149 A |
| 3,805,246 | 4/1974 | Colucci | 340/164 R |

*Primary Examiner*—Harold I. Pitts
*Attorney, Agent, or Firm*—Baldwin, Egan, Walling & Fetzer

[57] ABSTRACT

An electronic, push-button, combination door lock or electronic lock system which can only be activated by an individual having knowledge of a predetermined, arbitrary combination. The invention utilizes a series of sequential time-based logic gates to activate the lock system's devices. The system also includes inherent circuitry: (1) which will reset the system to its initial or ground reset state, in the event of a combination error; (2) which will prohibit the combination from activating the lock system's devices, if the combination is registered too rapidly. Every combination entry, made too quickly, is counted as an input error and resets the lock system; (3) which will tally input error factors and trigger alarm circuits or activate any type of defense system, which the degree of security requires.

10 Claims, 1 Drawing Figure

SEQUENTIAL TIME-BASE LOCK SYSTEM

For many years, man has been trying to devise different methods to safeguard, lock or prevent unauthorized persons from gaining access to his belongings, his offices or his confidential matters.

Lately, there have been new concepts to protect or lock man's premises. Some of these concepts deal with devices or keys of a new technology to open his doors. Generally this approach is as cumbersome and as much of a problem as a key. Alternate security concepts for gaining entry also include the use of word patterns, through voice wave or brain wave analysis. However, to achieve this function, highly complex, expensive devices and response means are required. Considering these factors, the inventor herein sets out to design a system whereby only the operator needs to be present to press an exact combination to obtain entry.

This approach to a lock system is not a new state of the art. Nor is using transistors or other solid state components to accomplish this function a new idea. In this concept the inventor utilizes a new concept in circuitry to achieve a very complex function by a very simple means.

Prior to this invention, relays, multi-ganged switches, register-and-gates and analog voltage reference systems, and/or combinations of these have been utilized to obtain this function. Their shortcomings have always been the fact that they can be "picked" by overloading the input circuits, by using mechanical manipulators to run through all the combinations very rapidly or by using other means of access fraud.

SUMMARY OF THE INVENTION

With these factors in mind, the inventor's present invention incorporates a new and novel concept to devise a lock system devoid of all previous faults. The lock system is devised in such a way, that it is immune to overloads to input circuits, mechanical manipulators, trial and error combination methods and/or tampering.

The means by which this is accomplished as will be hereinafter more fully defined is by combining a series of sequential time-based logic gates, which respond in a preselected time base pattern and which are combined with circuits which enable the system to record the number of input errors caused by improper or out of sequence actuation of the system such as, for example, actuation caused by one attempting to improperly operate the said lock system. As will hereinafter appear any signal actuation not part of the preselected combination, or any signal or digit of the combination entered out of sequence will reset the lock system to its initial state and will be counted as an input error. Also, if a signal or digit of the combination is entered into the system too quickly it will be counted as an input error.

DESCRIPTION OF THE PREFERRED EMBODIMENT

Figure 1:
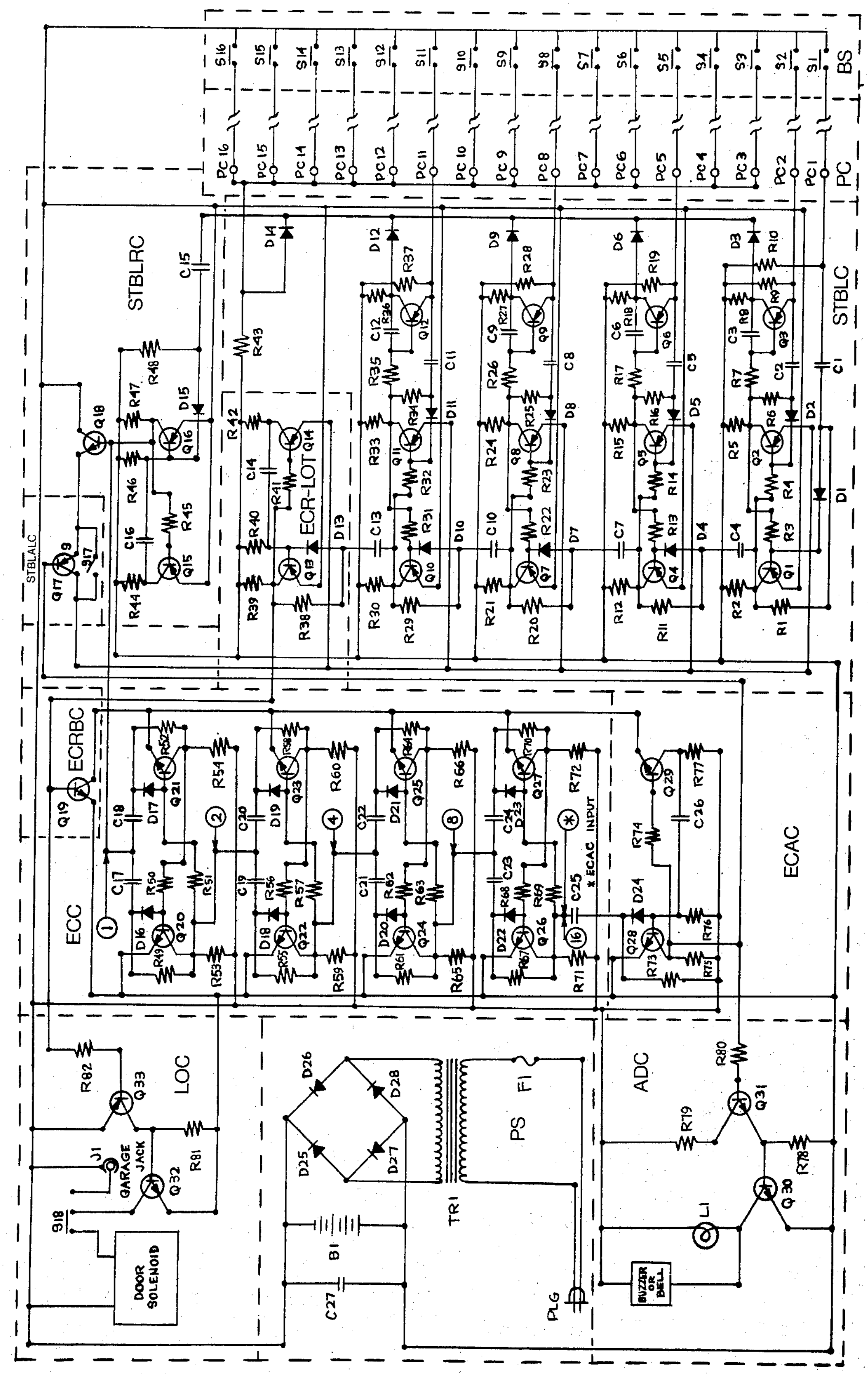

Specifically, a preferred embodiment of the concept of the present invention by which this is accomplished is illustrated in the schematic wiring diagram of FIG. 1.

With reference now directed to FIG. 1, the lock system of the present invention is composed of 13 sections identified as follows: 1. the button stack-BS; 2. the pin connectors-PC; 3. the sequential time-based logic circuit-STBLC; 4. the error counter reset-lock operator timer - ECR-LOT; 5. the sequential time based logic reset circuit-STBLRC; 6. the error counter circuit-ECC; 8. the error counter alarm circuit-ECAC; 9. the error counter reset buffer circuit-ECRBC; 10. the alarm device circuit-ADC; 11. the power supply-PS; 12. the lock output circuit-LOC; and 13. the sequential time-based logic alarm lockout circuit-STBLALC.

The button stack, BS, is composed of 16 single-pole press to make contact type switches.

The pin connector section, PC, is composed of sixteen pin connector sockets into which the pins, that are connected to the ends of the button stack leads, may be inserted to obtain any desired combination. The pin connector section is connected to the sequential time-based logic circuit.

The sequential time-based logic circuit, STBLC, is the heart of the lock system. In this section, the present embodiment utilizes four sequential time-based logic gates to provide the means by which the inputs, registered on the button stack, are processed and analyzed so that only the exact combination can activate the lock system.

While the present embodiment discloses four gates a minimum of one or any greater number may be utilized.

The error counter reset-lock operator timer, ECR-LOT, is connected to the last sequential time-based logic gate. When the proper combination has been entered, the last logic gate activates the ECR-LOT circuit. This circuit has two functions; first, to reset the error counter circuit, ECC, by sending a signal to the error counter reset buffer circuit, ECRBC; second, to activate the lock output circuit, LOC.

The sequential time-based logic reset circuit, STBLRC, is incorporated to reset the logic gates to their initial or ground state, whenever any digit of the combination is pressed out of sequence or when any digit not part of the combination is pressed. The sequential time-based logic reset circuit also provides a signal to the error counter circuit, ECC.

The error counter circuit, ECC, is composed in its presently disclosed form of four standard flip-flops, as referred to in the art. These are connected to form a binary digital counter. This circuit counts the number of input errors entered into the system and activates the error counter alarm circuit, ECAC. The number of mistakes allowed, before the alarm circuit is activated, can be varied by connecting the input of the error counter alarm circuit selectively to any one of the different stages of the error counter circuit ECC.

For example, if it is desired to provide an error counter circuit ECC capable of counting two error signals entered into the system, a single stage would only be required for said circuit ECC to accommodate two errors such as the stage identified as flip-flop Q20, Q21. Likewise, with two stages Q20, Q21 and Q22 and Q23 would accommodate four error signals into the system.

In the case of a single error for actuating alarm devices the output of the STBLRC, point 1 would be connected directly to the input of the ECAC or at the junction of C25 and R69.

The ECAC is connected to two circuits; first, to the sequential time based logic alarm lockout circuit, STBLALC. The STBLALC has a transistor, which can permanently render the STBLC inoperative during an alarm period. This means that any digit entered on the button stack will be counted as an input error. A defeat switch S17 in the STBLALC can eliminate the cutoff of the STBLC. Second, the ECAC is connected to the alarm device circuit, ADC. The ADC is activated by the ECAC, whenever the predetermined number of errors have activated the ECAC.

The lock output circuit, LOC, is connected to the ECR-LOT circuit and provides the means by which a door, solenoid bolt, garage door opener or other locking device may be activated.

The final circuit to be denoted is the power supply, PS. This circuit is designed to provide the necessary voltage and current required by the other lock circuits. Incorporated in the PS, along with the transformer, capacitor and diodes, is a 12 volt, rechargeable battery, which can provide power to the lock system, if the line voltage fails.

Thus far, the brief outline of the sections of the lock circuitry describes their abbreviations, functions and interrelationships.

Now that the basic circuits have been identified, they will be hereinafter discussed in greater detail, so that the total lock system operation may be clearly understood.

This can be done with the aid of FIG. 1.

An important circuit of the present concept is the sequential time-based logic circuit, STBLC. It is also the most complex and unique circuit. This circuit is the "key" to the entire lock system. Since it is unique, it requires the most detailed explanation. There are two circuits associated very closely with the STBLC. These are the sequential time-based logic reset circuit, STBLRC, and the error counter reset-lock operator timer, ECR-LOT.

To best explain the operation of the STBLC, it is paramount to consider the operation and workings of a single sequential time-based logic gate. Therefore, considering a single logic gate, let us examine the first stage of the STBLC. This stage is composed of transistors, Q1, Q2, Q3, and their related components. The first consideration to be discussed is: What is a sequential time-based logic gate? To help explain its operation, the following logic statements are made showing input sequence, time factors and their resulting outputs from the gate. We define the symbols in the following manner:

S1 = pressing switch 1
$1 = not pressing switch 1
S2 = pressing switch 2
A = "returning" the logic gate to its initial state so that it triggers the next logic stage without activating the STBLRC.
B = triggering the STBLRC which will reset all of the stages of the STBLC to their initial states and hold the ECR-LOT circuit in a locked condition.
T = time required to change the state of Q3 from a "ready" to a "passive" condition
To = any time less than T, such that Q3 is still in a "ready" state.
$S_n$ = Pressing any switch which is not part of the combination
T>To Equations:

Symbol ∧ = and

1. S1 ∧ T ∧ S2 → A
2. S1 ∧ To ∧ S2 → B
3. $1 ∧ S2 → B
4. S1 ∧ $S_n$ → B

In Equation 1., the output from state 1 of the STBLC is the desired output which will trigger the second stage of the STBLC without resetting the logic stages. This is accomplished when S1 is pressed and the proper amount of time, T, is allowed so that Q3 may change from a "ready" state to a "passive" state. Then, when S2 is pressed, the logic stage is returned to its initial state, which provides output A, or the correct output. Q3 was not activated by pressing S2 because it was in a "passive" state. Therefore, output B is suppressed and is not sent to the reset circuit, the STBLRC.

In equation 2., the output from the logic stage is B. Since B is defined as triggering the STBLRC, which will reset all of the stages of the STBLC and hold the ECR-LOT in its locked state, this is not a desired result. In fact, what is accomplished is that the entire input logic circuit, the STBLC, has been reset to its initial or ground state. In equation 2., output B is obtained because S1 was pressed in sequence, but only time, To, was allowed before pressing S2. This means that S2 was pressed too quickly for Q3 to have transferred from a "ready" state to a "passive" state. Therefore, pressing S2 turns Q3 on instantly sending output B to the input of the STBLRC.

In equation 3., the output B is again obtained because the sequence of inputs is incorrect. Since $1 means the first entry is never made, Q3 remains in a "ready" state. Time T has no significance because S1 must be pressed to change Q3 from a "ready" state to a "passive" state. Since S1 is never pressed, Q3 remains in a "ready" state. So, when S2 is pressed, Q3 sends output B to the STBLRC.

In equation 4 output B is obtained because an incorrect entry has been registered. S1 has been pressed properly so Q3 transfers from a "ready" to a "passive" state. When any switch $S_n$ (not a part of the combination) is pressed, the voltage across R43 drops from −12 volts to 0 volts which sends a resetting signal through diode D14, capacitor C15, diode D15 to the STBLRC to effect the reset of the same. This resets the lock to its initial state.

It is necessary now, to explain how the required inputs and designated outputs, described by equations 1, 2, 3 and 4 are accomplished electronically in the first stage. It is relevant then, to describe the voltages and conditions which exist in the first logic stage, when it is in its initial or ground state. In the ground state, let us examine the conditions of transistors Q1, Q2, Q3 and the interrelationships of these transistors. Q1 is in a conductive or "on" state, therefore, the collector voltage of Q1 is 0V. As a result of this, Q2 is biased by R4 in a non-conducting or "off" state. Therefore, Q2's collector voltage is negative or about −6V. Because of Q2's condition, capacitor C3 has a voltage of about −6V stored across it. Q3 is in a common emitter configuration so that when S2 is pressed, the −6V at the base of Q3 is more than enough to turn Q3 "on" instantly. Therefore, Q3 is said to be in a "ready" state, such that it will turn "on" if S2 is pressed.

When S1 is pressed, a positive voltage is transmitted through capacitor C1 and diode D1 to the base of Q1 which turns Q1 "off". Therefore, Q1's collector voltage goes to about −6V. The voltage of Q1's collector through R4 turns "on" Q2. Q2's collector voltage goes from −6V to 0V, then C3 begins to charge. It charges at a specific rate determined by the values of C3, R7 and R8. When C3 is fully charged, which takes time T, the base of Q3, which is connected to the now positive side or 0V side of C3, is below the necessary voltage required to turn "on" Q3. Therefore, Q3 is in a "passive" state. Thus, if S2 is pressed, Q3 may not turn "on". Remember that C3 takes time T to charge. Now, if S2 is pressed before time T, the bias voltage to Q3 remains too negative so that Q3 will turn "on". Thus, the collector voltage of Q3 will instantly be positive. Therefore, D3 sends a positive pulse to the STBLRC.

It is then clearly seen that for the operation to follow logic equation 1, the first input must be registered, time T must be allowed before the second input is registered and the second input must be registered. It is clearly seen that for the operation to follow logic equation 2, if S1 is correctly registered, but not enough time T is allowed before registering the second input, pressing S2 will reset the STBLC. It is then clearly seen that for the operation to follow logic equation 3, if S1 is not entered, T has no significance, and S2 will reset the STBLC.

To likewise follow the logic of equation 4, the output B is again obtained, however output B in this instance is not derived as a logic stage conditioned output but rather as an independent resetting signal produced whenever a digit not part of the combination has been registered.

At this time, it is important to note the connection of the four stages of the STBLC. Again, referring to FIG. 1, C4 and D4 connect the collector of Q1 to the base of Q4. If the proper combination has been registered, with the necessary time between inputs, when S2 is pressed, Q2 is turned "off" and Q1 is turned "on". Q3 is in a "passive" state, so that output B is suppressed. As Q1 turns "on", the voltage at Q1's collector goes from −6V to 0V. This positive pulse is sent through C4 and D4 to the base of Q4. This turns Q4 "off" and Q5 "on". When Q5 turns "on," its collector voltage goes from −6V to 0V. This causes C6 to begin charging at the same rate as C3, since the values of C6, R17 and R18 correspond to those of C3, R7 and R8 respectively.

Thus, time T must again be allowed before S5 is activated. It is, therefore, seen that all the inputs, even if they are registered in the proper sequence, must allow time T before the next correct digit is entered. The last two stages are similarly connected, therefore, their activation and operation correspond exactly to stage 2. The only factor, yet to discuss, is how the stages in the STBLC and the ECR-LOT are reset.

Referring to FIG. 1, let us now turn our attention to the STBLRC. This section is composed of three transistors, Q15, Q16 and Q18. Q15 and Q16 are hooked in a monostable flip-flop configuration and act as a trigger to Q18, which is a buffer switch. The input to the STBLRC comes to the base of Q16 via D15 and C15. C15 is connected to D14, D12, D9, D6 and D3. D14 is hooked to R43 and all switches which are not part of the combination. These are S16, S15, S14, S13, S12, S10, S9, S7, S6, S4 and S3. It may be noted, that by "scrambling" the pin connectors, any of the 16 switches may be used in the combination. Also, any switch may be used for any digit of the combination. Referring, however, to the switches listed, which are not part of the combination in FIG. 1, it is recognized that the voltage at the junction of R43-D14 is negative. Whenever any of the switches, not part of the combination are pressed, a positive pulse will be sent through D14 to the input of the STBLRC. This positive pulse will trigger the monostable flip-flop to reverse its condition. The flip-flop will remain in this condition for a time interval Tr determined by the values of C16, R44 and R46. During this time, the base of Q18 is at cutoff. Since Q18 cannot conduct, it acts as an open switch, thereby disconnecting the emitters of Q2, Q5, Q8, Q11 and Q14 from the power source PS. Since these emitters are disconnected from ground or 0V, all their collector voltages will be made minus which will reset any stage of the STBLC or the ECR-LOT to its initial or ground state. If any logic gate of the STBLC is in a condition to trigger the next stage, as it resets, it will send a pulse to trigger the next stage. However, since the emitters of the next stage are also in an open condition, all stages are unable to accept the input and all digits, which have been entered, are lost, i.e., the combination must be started from the beginning. Whenever any stage of the STBLC is activated out of sequence or too quickly, a positive pulse will be sent through either D3, D6, D9 or D12 depending upon which stage receives an incorrect entry. No matter, the STBLRC reverses its condition and the reset function occurs exactly as when the digit not part of the combination is pressed.

Now that the operation of the SRBLC and the STBLRC have been explained, let us proceed to go through the correct combination and describe the sequential staging of the STBLC and, how the other circuits are affected.

The lock system is in its initial or ground state. S1 is pressed, Q1 turns "off," Q2 turns "on," which puts Q3 in a "passive" state. S2 is pressed, Q2 turns "off", Q1 turns "on", Q4 turns "off". Q5 turns "on", which puts Q6 in a "passive" state. S5 is pressed, Q5 turns "off", Q4 turns "on", Q7 turns "off," Q8 turns "on," which puts Q9 in a "passive" state. S8 is pressed, Q8 turns "off," Q7 turns "on," Q10 turns "off," Q11 turns "on," which puts Q12 in a "passive" state. S11 is pressed, Q11 turns "off," Q10 turns "on" and triggers Q13, of the ECR-LOT, to turn "off." When Q13 turns "off," Q14, of the ECR-LOT, turns "on" for the period of time, determined by the time constant associated with C14, R38 and R40.

When Q13 turns "off", it performs two other functions in addition to turning Q14 "on." First, it turns "off" Q19, of the ECRBC, which is normally "on," thereby resetting the ECC and ECAC to their initial or ground state. This means the previous number of mistakes registered is erased. Second, it turns "on" Q33 of the LOC, which turns "on" Q32 of the LOC, so that the door solenoid is activated. Thus, the lock system is opened.

Now, let's say that an error is committed in the combination. For example, the first two digits of the combination have been entered correctly. Therefore, the first digit of the combination has turned Q1 "off" and Q2 "on", which puts Q3 in a "passive" state. Pressing the second digit of the combination, turns Q2 "off," and Q1 "on." Therefore, the second stage of the STBLC is turned "on," i.e., Q4 is turned "off" and Q5 is turned "on," which begins to change Q6 from a "ready" to a "passive" state. Let us suppose that the next correct digit is entered too quickly. Since Q6 is not in a "passive" state, a reset output will be sent to the STBLRC, which will reset the STBLC. If any digit of the combination is registered out of sequence, or a digit not part of the combination is registered, a positive pulse is sent to the STBLRC, and the STBLC is reset to its initial or ground state. As the STBLC is reset, a pulse is sent to the ECC.

The error counter circuit, the ECC, tabulates the number of errors registered. The error counter alarm circuit, the ECAC, can be connected to any of the numbered points (1, 2, 4, 8, 16) in the schematic of FIG. 1 of the ECC circuit. These numbered points show the number of errors, which must be registered, before the ECAC is activated. In the illustrated embodiment, the circuit schematic depicts that 16 errors must be registered before the ECAC is activated. When the ECAC is activated, Q28 turns "off" and Q29 turns "on." The alarm period is determined by the time constant associated with C26, R74 and R75. This can be chosen so that the alarm is triggered for a few seconds or several minutes, if required.

There are two circuits, which are activated by the ECAC. The first is the sequential time-based logic alarm lockout circuit, the STBLALC, which is made up of one transistor, Q17, and a "defeat" switch, S17. Q17, of the STBLALC, is normally in a conductive condition or turned "on." However, when the ECAC flips, the bias voltage, which is applied to the base of Q17, goes from minus to plus. This turns Q17 "off." Since Q17 is in series with Q18, of the STBLC, it turns "off" the emitters of Q2, Q5, Q8, Q11 and Q14, holding the STBLC and the ECR-LOT in a lockout phase. Thus, whenever any switch of the BS is pressed, it will be considered an error. S17, of the STBLALC, is called a "defeat" switch because it connects the emitter and the collector of Q17. Whenever it is closed, the STBLALC will be pypassed, so that the buttom stack will operate in its normal manner.

The other circuit, connected to the ECAC, is the alarm device circuit, the ADC. Transistors Q30 and Q31, of the ADC, read the condition of Q23 of the ECAC. When Q28 is "on," the voltage at the collector of Q28 is minus. Therefore, Q30 and Q31 are "off". When Q28 turns "off", Q30 and Q31 are turned "on". The buzzer, bell, light or other suitable visual or audible indicator connected, as the load of Q30, will thus be actuated to signal the actuation of the ECAC circuit.

The mode of operation or behavior of the present system, when switch S17, of the STBLALC, is closed will now be described. With S17 closed, the STBLALC circuit is defeated. In this event, the alarm devices are activated when the designated number of errors are registered on the button stack. Digits may still be recorded by the STBLC. Thus, if the correct combination is registered, the ECR-LOT will activate the lock system and will reset the ECC and the ECAC.

Therefore, the ADC is turned "off," and the lock is again in a normal, operating mode.

It is important to point out that by using "*n*", number, of sequential time-based logic gates in series, the number of combination digits is "$n + 1$." This implies that any number of digits can be used in the combination, depending upon the degree of security required. In the same sense, by utilizing "*n*" number of error counter stages, it is possible to allow any number of mistakes given by the equation $2^{(n)}$ = the number of mistakes allowed before alarm activation. It is thus seen, that by using any number of sequential time-based logic gates in series and by using any number of counter flip-flops, the lock system enjoys any number of combination digits and any number of allowed input errors.

Following this concept, the lock output circuitry may be varied to accommodate any type of locking or control device. Also, the alarm device circuit is set up so that it will operate standard devices. However, by using triac triggering methods or other electronic controlling devices, any type of security system can be employed.

Inasmuch as various possible embodiments of the invention may be made without departing from the scope thereof, it is to be understood that all matter herein set forth or shown in the accompanying drawing is to be interpreted as illustrative and not in a limiting sense.

What is claimed is:

1. An electronic lock system for performing a locking and unlocking work function upon receiving a plurality of input signals in a predetermined sequence and time relationship to said system comprising, first circuit means including at least one gate circuit, time-based circuit means in said gate circuit, second circuit means including locking circuit means, third circuit means connectable to said gate circuit and said second circuit means, means for sequentially applying two input signals to said gate circuit required to be separated one from the other by an interval of time determined by the time period of said time-based circuit means to provide an output signal from said one gate circuit to effect the actuation of said second circuit means, said time-based circuit means being operable provided the second sequentially applied input signal to said one gate circuit is applied before the expiration of the time period of said time-based circuit means to provide a signal output therefrom effective to actuate the third circuit means to disable the second circuit means and reset the gate circuit.

2. An electronic lock system for performing a locking and unlocking work function upon receiving a plurality of input signals in a predetermined sequence and time relationship to said system comprising, first circuit means including at least one gate circuit, time-based circuit means in said gate circuit, second circuit means including locking circuit means, third circuit means connectable to said gate circuit and said second circuit means, means for applying preselected first and second input signals to said gate circuit in a preselected time relationship required to be separated wherein the second input signal is required to be delayed with respect to the first input signal by an interval of time determined by the time period of said time-based circuit means to provide an output signal from said one gate circuit to effect the actuation of said second circuit means, said time-based circuit means being operable upon receiving the preselected second input signal before receiving, if at all, the preselected first input signal to provide a signal output effective to actuate the third circuit means and disable the second circuit means and reset the gate circuit.

3. An electronic lock system for performing a locking and unlocking work function upon receiving a plurality of input signals in a predetermined sequence and time relationship to said system comprising, first circuit means including at least one gate circuit, time-based circuit means in said gate circuit, second circuit means including locking circuit means, third circuit means connectable to said gate circuit and said second circuit means, means for sequentially applying two preselected input signals of said plurality of input signals to said gate circuit and which are required to be separated one from the other by an interval of time determined by the time period of said time-based circuit means to provide an output signal from said one gate circuit to effect the actuation of said second circuit means, and means for applying another input signal to said third circuit means which signal is not in accord with the preselected sequence of input signals required to provide the actuation of the second circuit means, said third circuit means being operable upon receiving said another input signal at any time to provide an output signal effective to disable the second circuit means and reset the gate circuit.

4. An electronic lock system as is defined in claim 1 and wherein the first circuit means includes a plurality of serially connected gate circuits, and wherein the first of said serially connected gate circuits is responsive upon sequentially receiving two preselected input signals separated one from the other by an interval of time determined by the time period of said time-based circuit means of said first gate circuit to provide a first gate output signal, means connecting said first gate output signal to the next successive gate circuit of said serially connected gate circuits, time-based circuit means in said next gate circuit, means for applying another input signal to said next gate circuit which when applied to said next gate circuit is required to be separated in time after receipt of the first gate output signal by a time interval determined by the time period of said next gate circuit time-based circuit means, and said next gate circuit being then responsive to provide an output signal effective to actuate the second circuit means.

5. In an electronic lock system as is defined in claim 4 and wherein the first circuit means includes at least one additional gate circuit having a time-based circuit means therein, and wherein said additional gate circuit upon sequentially receiving two preselected input signals one of which is the output signal of the next preceding gate circuit and the second of which is another input signal of said plurality input signals to provide an output signal from said additional gate circuit, and wherein the application of said input signals to said additional gate circuit are required to be separated one from the other by a time interval determined by the time period of the time-based circuit means of said additional gate circuit, and the output signal of said additional gate circuit being then effective to actuate the second circuit means.

6. In an electronic lock system as is defined in claim 1 and wherein fourth circuit means having counting means are connectable to the third circuit means and responsive to the actuation of the third circuit to accumulate a count of those input signals to the lock system which actuate the third circuit means.

7. In an electronic lock system as is defined in claim 6 and wherein fifth circuit means are connectable to the fourth circuit means, said fifth circuit means including sensory alarm means, and said fifth circuit means being responsive to the accumulation of a predetermined number of signals by said fourth circuit means.

8. In an electronic lock system as is defined in claim 7 and wherein the fifth circuit means is connectable to the third circuit means and operable to disable the second circuit means and to hold the first circuit means in a reset condition during the actuation of the fifth circuit means.

9. In an electronic lock system as is defined in claim 8 and wherein a switch in the third circuit means provides for the operation of the first circuit means and the second circuit means during the actuation of the fifth circuit means.

10. In an electronic lock system as is defined in claim 6 and wherein the fourth circuit means is connectable to the second circuit means and responsive to the actuation of the second circuit means to reset the fourth circuit means to its zero count position and to disable the fifth circuit means.

* * * * *